United States Patent [19]

Bailey

[11] 3,911,580

[45] Oct. 14, 1975

[54] COAXIAL VIBRATING ISOLATION UNIT FOR A CHAIN SAW INCLUDING DISCRETE, INDEPENDENTLY OPERABLE ELEMENTS

[75] Inventor: Jay Richard Bailey, Chatsworth, Calif.

[73] Assignee: McCulloch Corporation, Los Angeles, Calif.

[22] Filed: July 3, 1974

[21] Appl. No.: 485,424

[52] U.S. Cl. .................. 30/381; 267/137; 173/162
[51] Int. Cl.² ....................................... B23D 57/02
[58] Field of Search ...... 267/137, 141, 140; 30/381, 30/382, 383, 384, 385, 386, 387, 388, 389; 248/15, 18, 22, 358 R; 173/162

[56] References Cited
UNITED STATES PATENTS

| | | | |
|---|---|---|---|
| 3,270,998 | 9/1966 | Keetch | 267/141 |
| 3,396,925 | 8/1968 | Dickie et al. | 267/141 |
| 3,652,074 | 3/1972 | Frederickson et al. | 267/137 |
| 3,813,776 | 6/1974 | Frederickson et al. | 30/381 |

Primary Examiner—James B. Marbert
Attorney, Agent, or Firm—Burns, Doane, Swecker & Mathis

[57] ABSTRACT

A vibration isolation system characterized by a plurality of discrete, energy and vibration absorbing and dissipating means, which system is particularly suited for incorporation in a chain saw. In this context, the chain saw would conventionally include a vibration generating assembly comprising an interconnected engine and cutter chain means and also comprise an interconnected inertia and handle assembly. A plurality of vibration isolation means would serve to interconnect each of these assemblies. At least one of these vibration isolating means would comprise a diaphragm means connected with one of the assemblies and a shaft means connected with the other of the assemblies. The diaphragm means uniquely includes a plurality of discrete, individually operable, energy absorbing and dissipating and vibration dampening resilient beam means, compression pad means, and energy dissipating and motion dampening means.

6 Claims, 4 Drawing Figures 3,911,580

COAXIAL VIBRATING ISOLATION UNIT FOR A CHAIN SAW INCLUDING DISCRETE, INDEPENDENTLY OPERABLE ELEMENTS

GENERAL BACKGROUND, OBJECTS, AND SUMMARY OF INVENTION

The present invention contemplates an improvement in a vibration isolation system which is particularly adapted for use with chain saws, which system is of the general type described in U.S. Pat. No. 3,813,776 (Frederickson et al), issued June 4, 1974, and assigned to the assignee of the present invention.

The present invention retains principal advantages and characteristics of the system featured in the aforesaid Frederickson et al U.S. Pat. No. 3,813,776 and is characterized by advantageous operating characteristics of this system, augmented by a unique provision and utilization of discrete, individually operable, vibration reducing and energy dissipating and absorbing, resilient beam means, compression pad means, and energy disipating and motion dampening means.

Insofar as the present invention incorporates major advantages and structural and operating characteristics of the aforesaid Frederickson et al concept, the disclosure of Frederickson et al U.S. Pat. No. 3,813,776 is herein incorporated by reference.

The significant advantages of the Frederickson et al concept, which are especially significant in the context of a chain saw, are described and summarized in the aforesaid Frederickson et al Patent. However, the present invention constitutes a marked improvement on the Frederickson et al concept while retaining advantageous and significant facets of the Frederickson et al system.

A particular object of the present invention is to retain advantageous characteristics of the Frederickson et al vibration isolation system while further reducing vibratory acceleration and reducing the spring constant of such a vibration isolation system.

A further object of the invention is to retain significant and advantageous characteristics of the Frederickson et al vibration isolation system while effecting a meaningful increase in vibration dampening and while substantially minimizing or eliminating hoop tension action in the diaphragm means of the aforesaid Frederickson et al system.

Yet another basic object of the invention is to retain material and advantageous characteristics of the Frederickson et al system while significantly lowering the transmittibility of energy to a chain saw handle system and while significantly increasing vibration dampening.

Yet another object of the invention is to effect a localized energy dissipation and absorption so as to lessen the transmission of vibration to the handle system of a chain saw.

In accomplishing at least some of the desired objectives of the present invention, a vibration isolation system is contemplated which may be incorporated in a chain saw having a vibrating assembly and a support means. The vibrating assembly may include an engine having a crankshaft and a cutter chain means driven by the engine and traversing cutting path. The support means may include a handle means or assembly, preferably associated with an inertia means. Such a system is described, for example, in the U.S. Pat. No. 3,542,095 (Frederickson et al - Nov. 24, 1970), U.S. Pat. No. 3,652,074 (Frederickson et al - Mar. 28, 1972), and U.S. Pat. No. 3,698,455 (Frederickson et al - Oct. 17, 1972).

In the preferred context of the present invention, and as is described in the aforemention various Frederickson et al patents, a plurality of vibration isolation units serve to interconnect a vibrating assembly and a cradle-like support means.

At least one of these vibration isolation units or means, in accordance with the practice of the present invention, would include a resilient diaphragm means having an aperture, preferably extending transversely of the cutting path and possibly extending generally parallel with the axis of rotation of the crankshaft.

The shaft means would pass through the aperture of the diaphragm means, with the diaphragm means being journaled upon the shaft means. A first impedance means mounted on the shaft means would abuttingly and separably engage one side of the diaphragm means and a second impedance means, also mounted on the shaft means, would abuttingly and separably engage an opposite side of the diaphragm means.

A first mounting means connects the diaphragm means with one of the vibrating assembly and support means and a second mounting means connects the shaft means with the other of the vibrating assembly and support means.

The improvement of the present invention resides in novel structural characteristics of the diaphragm means, acting in combination with the overall vibration isolation unit.

These improvements reside, in part, in a plurality of independently operable, resilient beam means which are spaced circumferentially about the shaft means. Each of the resilient beam means is spaced circumferentially from others of the resilient beam means and is operable to flex longitudinally and transversely of the shaft means, independently of others of the said beam means.

The improvement of the present invention further resides in a plurality of independently operable, resilient compression pad means which are spaced circumferentially about the shaft means. Each of the compression pad means is carried by a beam means and is spaced circumferentially from others of the compression pad means. Moreover, each of the compression pad means is operable to compressibly absorb energy in localized cooperation with the shaft means, independent of others of the compression pad means.

Other aspects of the improvement of the present invention reside in a plurality of independently operable, energy dissipating and motion dampening means which are spaced circumferentially about the shaft means, with each of these energy dissipating means being disposed in energy dissipating, frictional cooperation with at least one of the impedance means. Each of these energy dissipating and motion dampening means is carried by a beam means and is spaced circumferentially from others of the energy dissipating and motion dampening means. Further, each of the energy dissipating and motion dampening means is operable to effect energy dissipating and motion campening, frictional cooperation with an impedance means and the shaft means in response to movement of the energy dissipating means relative to the impedance means and the shaft means.

In a more restricted aspect of the invention, characterized by a presently preferred embodiment, each beam means extends radially inwardly from an annular rim portion of the diaphragm means and has lateral sides converging radially inwardly of the rim means toward the shaft means. Each of the compression pad means is characterized by a convex extremity of a beam means which is disposed in substantially linear engagement with the outer periphery of the shaft means. Intermediate the spaced beam means are laterally disposed recess means into which the beam means can individually deform.

As will also be recognized, the invention is characterized by the cooperatively interacting shaft means, impedance means, and the discrete, independently operable, resilient beams means, resilient compression pad means, and energy dissipating and motion dampening means, all preferably associated with the aforesaid beam deformation accommodating, lateral recess means alternating circumferentially with the beam means.

In describing the invention, reference will be made to a presently preferred embodiment illustrated in the appended drawings. However, it will be recognized that the drawings and related description of this preferred embodiment are presented by way of illustration and example, and not by way of delimiting the invention herein set forth.

DRAWINGS

FIG. 1 provides a fragmentary, side elevational view of a representative chain saw including a vibration isolation system in which the vibration isolating means of the present invention may be advantageously employed. In FIG. 1, the vibration isolating means of the present invention is incorporated between the lower side of an engine assembly and the upper side of a lower handle means which extends beneath the engine assembly;

FIG. 2 provides an enlarged, fragmentary, vertically sectioned, elevational view of the vibration isolation means incorporated in FIG. 1 between the lower side of the engine means and the upper side of the lower handle means;

FIG. 3 provides a still further enlarged, transverse sectional view of the FIG. 2 vibration means as viewed along the section line 3—3 of FIG. 2;

FIG. 4 provides a perspective, fragmentary view of one of the plurality of circumferentially spaced, discrete beam means of the diaphragm means of the vibration isolating mechanism featured in FIG. 1, 2, and 3.

DETAILED DESCRIPTION OF INVENTION

Chain Saw Embodiment

Figure 1:
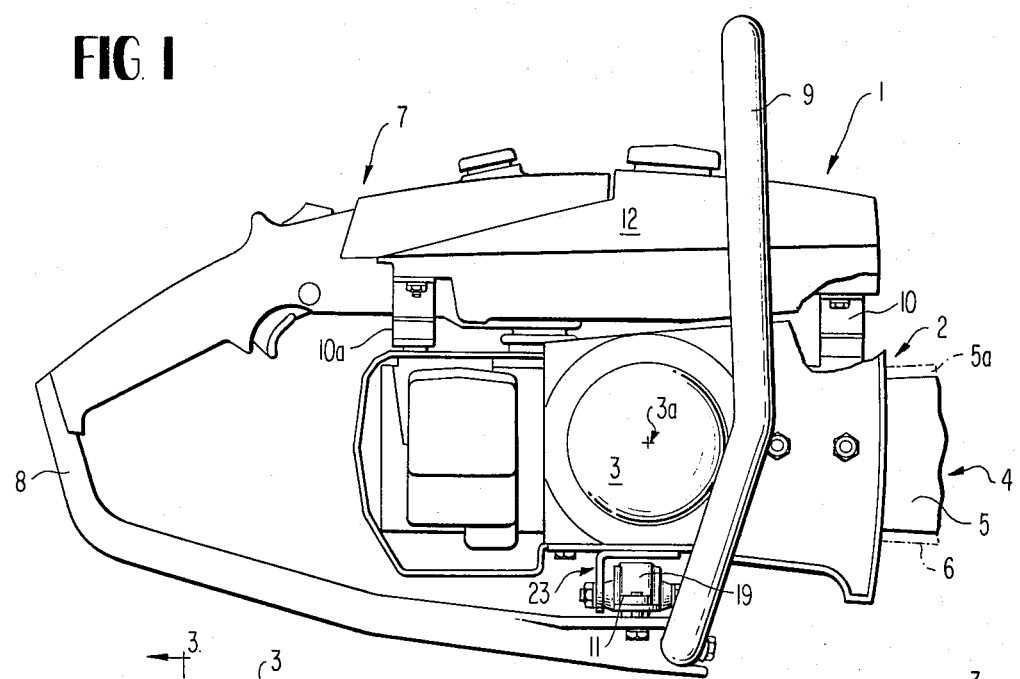

FIG. 1 provides a fragmentary side elevational view of a representative chain saw 1. Chain saw 1 is of the general type featured, for example, in United States Frederickson et al U.S. Pat. No. 3,813,776.

Chain saw 1 includes a vibration generating assembly 2 which is characterized by a drive engine 3 and a cutter assembly 4. Cutter assembly 4 includes a guide bar 5 and a cutter chain 6 mounted on the periphery of the guide bar 5 for endless traversal through a cutting path 5a, in a manner well understood in the chain saw art. Cutter chain 6 is driven by engine 3 through a drive mechanism of the type now used in the chain saw art.

Engine 3, in a presently available commercial chain saw embodiment, would have a crankshaft having an axis of rotation 3a extending trasversely of, and perpendicular with respect to, the longitudinal plane of the cutting path 5a, define by the periphery of guide bar 5.

Chain saw 1 further includes a cradle-like, handle assembly 7. Assembly 7 comprises a longitudinally extending, U-shaped handle portion 8 and a transversely extending handle 9. Handle means 9 may fully or partially, transversely circumscribe the engine-cutter assembly 2.

Vibration generating assembly 2 is resiliently supported within the cradle or support means 7 by a plurality of vibration isolation units. These unit preferably are generally aligned with a plane extending generally centrally and longitudinally of the assembly 2, in the manner described, for example, in Frederickson et al U.S. Pat. No. 3,542,095. Thus, as shown in FIG. 1 of the present disclosure, vibration generating assembly 2 may be supported by three vibration isolation units 10, 10a and 11.

Vibration units 9 and 10 are interposed between the upper portion of the engine assembly 3 and the lower portion of a fuel tank assembly 12 incorporated in the cradle means 7. Fuel tank assembly 12, in the manner generally described in the Frederickson et al U.S. Pat. No. 3,542,095. provides a significant inertia or vibration dampening function.

Structural characteristics of representative vibration isolation units 10 and 10a are discussed in Frederickson et al U.S. Pat. Nos. 3,542,095, 3,652,074, 3,698,455 and 3,813,776.

Structural and mounting characteristics of a vibration isolation assembly having a generic relationship to the vibration isolating assembly 11 of the present invention are disclosed in detail in the aforesaid Frederickson et al U.S. Pat. No. 3,813,776.

Prior to describing advantageous and novel structural characteristics of the vibration isolation unit 11 of the present invention, it is now appropriate to review structural and operational aspects of the vibration isolation unit 11 which are related generically to the vibration isolation system disclosed and claimed in the aforesaid Frederickson et al U.S. Pat. No. 3,813,776.

Generic Aspects

Figure 2:
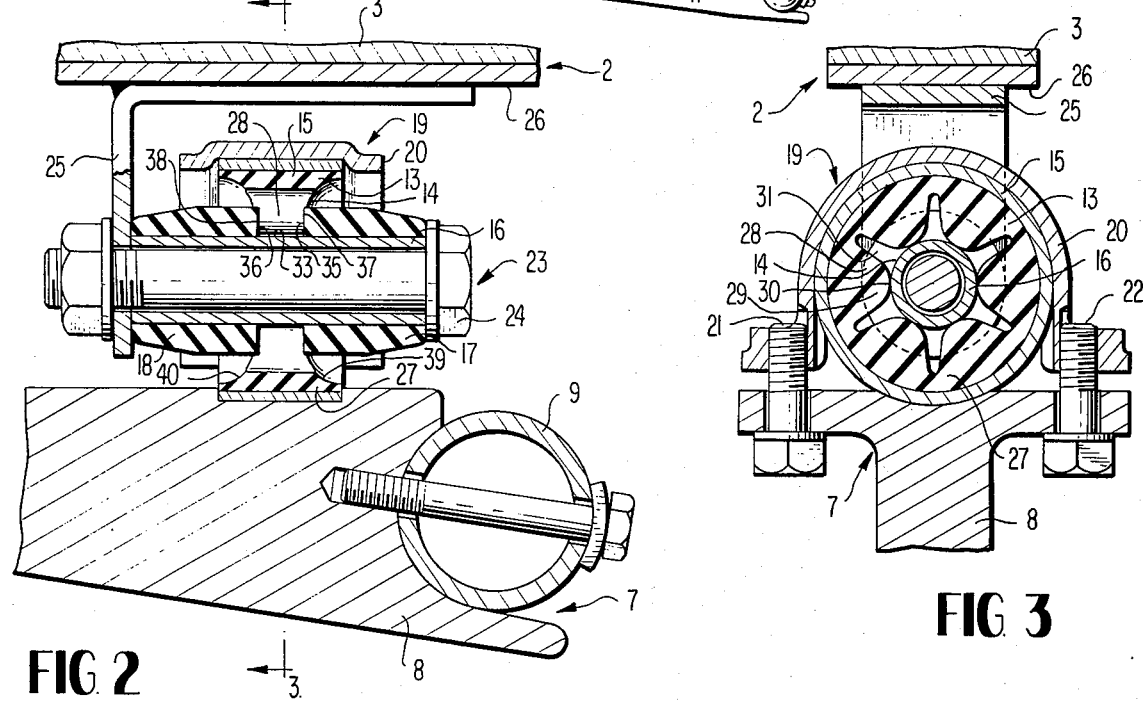
Figure 3:
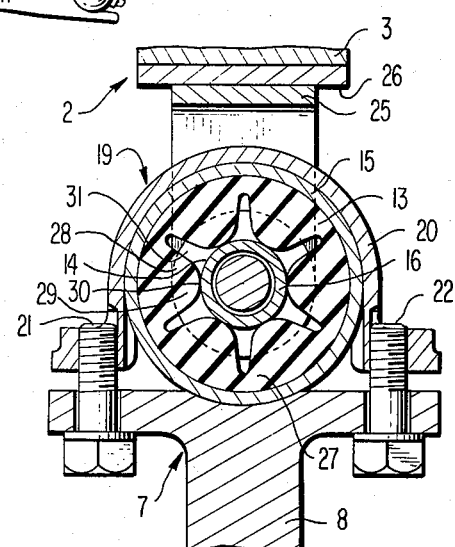

As shown in FIGS. 1–3, vibration isolation unit 11 includes a resilient, disc-like diaphragm means 13. This diaphragm means 13 has an aperture 14 which extends transversely of the cutting path 5a defined by chain 6 and which also extends parallel with the axis of rotation 3a of the crankshaft of engine 3. Diaphragm 13 is fabricated of rubber, neoprene or other elastomeric, resilient material and may be bonded to and supported within a cylinder-like metallic sleeve 15.

A hollow shaft means 16 passes through the aperture or central opening 14 of the diaphragm means 13, with this diaphragm means 13 being journaled upon the shaft means 16 as generally shown in FIGS. 2 and 3.

A first, annular, impedance means 17, mounted on the shaft means 16, abuttingly and separably engages one side of the diaphragm means 13 as shown in FIG. 2. A second, annular, impedance means 18, mounted on the shaft means 16, abuttingly and separably engages an opposite side of the diaphragm means 13, as is also shown in FIG. 2. Each of the impedance means 17 and 18 may be fabricated of elastomeric material, as shown, or in certain instances may comprise integral, metallic abutment portions of the shaft means 16.

A first mounting means 19 connects the diaphragm means 13 with one of said vibrating assembly 2 and the support means 7. In the FIG. 1-3 arrangement, mounting means 19 comprises a C- clamp 20 which secures diaphragm rim or sleeve 15 to support means 7 via clamping bolts 21 and 22. A second mounting means 23 connects the shaft means 16 with the other of the vibrating assembly and support means 7. In the illustrated embodiment, mounting means 23 comprises a threaded bolt, nut, and washer assembly 24 which connects shaft 16 to flange 25 which depends downwardly from the underside 26 of the housing of engine 3.

This representative mounting arrangement, presented by way of example, only, is also described in greater detail in U.S. Pat. No. 3,813,776.

Generic aspects common to the present invention and that of the aforesaid Frederickson et al U.S. Pat. No. 3,813,776 having been described, it is now appropriate to consider distinguishing and innovative structural and operational aspects of the vibration assembly 11 which characterize the present invention.

Distinguishing Features of Present Invention

The unique diaphragm means of the present invention includes an outermost, generally annular, elastomeric rim means 27. Rim means 27 supports a plurality of radially inwardly depending, finger-like, beam means 28. The radially intermost extremity of each such beam means 28 provides a compression pad means 29. Each beam means 28 further provides an energy dissipating and motion dampening, function means 30. Circumferentially interspersed laterally of the beam means 28 are lateral recess means 31. Thus, with the arrangement of these elements of the diaphragm means 13 as generally depicted in the embodiment presented herein by way of example, the diaphragm means 13 includes six each of the beam means 28, the compression pad means 29, the energy dissipating and motion dampening means 30, and the lateral recess means 31, with elements 27, 28, 29, and 30 all being integrally formed of resilient, elastomeric material.

The plurality of independently operable, resilient beam means 28 are spaced circumferentially about the shaft means 16, as shown in FIG. 3. Each of these resilient beam means 28 is spaced circumferentially from others of the resilient beam means. Further, each of the resilient beam means 28 is operable to flex longitudinally and transversely of the shaft means 16, independently of others of this beam means 28. In other words, the axial shock absorbing action of beam means 28 is one of flexure, more or less free of hoop tension action.

Figure 4:
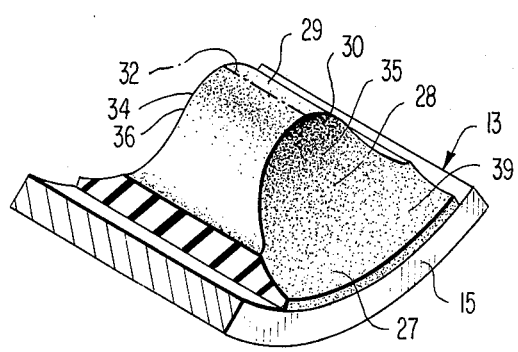

The plurality of independently operable, resilient compression pad means 29, proved by the convex extremity of the various beam means 28, as shown in FIG. 3, are spaced circumferentially about the shaft means 16. Each of these compression pad means 29 is carried by a beam means and is spaced circumferentially from others of the compression pad means. In addition, each of the compression pad means 29 is operable to compressibly absorb energy in localized cooperation with the shaft means 16, independent of others of the compression pad means. This localized cooperation is provided by the substantially linear contact zone 32, shown in phantom in FIG. 4, and extending longitudinally between the outer periphery 33 of the shaft means 16 and the extremity 34 of the compression pad means 29.

The plurality of independently operable, energy dissipating and motion dampening means 30 are provided by the tips 32 and side portions 35 and 36 of the beam means 28. These energy dissipating and motion dampening means are spaced circumferentially about the shaft means 16, with each of the energy dissipating means 30 being disposed in energy dissipating, frictional cooperation with at least one, and usually both of the impedance means 17 and 18 in frictional cooperation (i.e. circumferentially sliding contact) with the shaft means 16. The frictional interactions between sides 35 and 36 of the beam means and the end faces 37 and 38 of the impedance means 17 and 18, respectively, contemplates circumferential, radial, and transverse movements, and combinations of such movements.

Each of the energy dissipating and motion dampening means 30 is carried by a beam means 28 and is spaced circumferentially from others of the energy dissipating and motion dampening means.

In addition, each of these energy dissipating and motion dampening means 30 is operable to effect energy dissipating and motion dampening, frictional cooperation with one or both of the impedance means 17 and 18 and with the shaft means 16 in response to movement of the energy dissipating means 30 relative to the impedance means and shaft means.

In the arrangement illustrated by way of example, the rim means 27 includes radially inwardly converging concave side walls 39 and 40 which merge, respectively and smoothly into the relatively flat and mutually parallel side walls 35 and 36 of the motion dampening means 30. The side wall 35 and 36 of the motion dampening means 30, like the side walls 37 and 38 of the impedance means 17 and 18, extend transversely of, and perpendicular relative to, the axis of the shaft means 16. It is comtemplated that side walls 35 and 36 of the energy dissipating and motion dampening means 30 may be disposed in a somewhat snug or interfering fit relationship with the side wall means 37 and 38 of the impedance means so as to enhance frictional dissipation of energy.

Viewed in transverse cross section as shown in FIG. 3, each of the compression pad means 29 may be characterized by a convex extremity.

During operation of the chain saw 1, vibrations generated by the assembly 2 will be dissipated, dampened and absorbed by a variety of quite likely, synergistically interacting phenomena.

Independent flexure action of the beam means 28 will contribute to energy dissipation and motion dampening, as will localize compressional interaction between the extremities 32 of the compression pad mean 29 and the outer circumferential periphery of the shaft means 16. Further, energy dissipation and motion dampening action will reside in the frictional interaction between the side wall means 35 and 36 of the energy dissipating and motion dampening means 30 with the side walls 37 and 38 of the impedance means 17 and 18. Depending upon the extend of torsional or relative circumferential movement between the diaphragm means 13 and the shaft means 16, additional dissipation of energy and motion dampening may be effected by frictional interaction between the tip means 32 of the energy dissipating and motion dampening means 30 and the outer periphery of the of the shaft means 16.

Summary of Certain Major Advantages and Overall Scope of Invention

The totality of the interacting phenomena of the present invention is believed to produce a material reduction in the degree of vibratory acceleration transmitted from the vibrating assembly 2 to the handle or support means 7.

The independently operable characteristic of the beam means 28 provides a "softening" effect which reduces the generation of vibration within the handle assembly 7, due possibly to a reduction in or substantial elimination of hoop tension type interaction.

The presence of the circumferentially space, lateral recess means 31 further contributes to the softening action by providing lateral spaces into which the beam means 28 may individually, laterally deform.

The localized energy dissipating and motion dampening action of the compression pad means 30 is believed, due to the localized nature of the compressional absorption of energy, to materially reduce the degree of vibration transmitted from the assembly 2 to the handle or cradle means 7.

The individually operable nature of the beam means 28 and their associated frictional acting, energy dissipating and motion dampening meana 31 is also believed to contribute markedly to the lower degree of transmission of vibrations from the assembly 2 to the handle 7.

The totality of these interacting phenomena are believed to produce a reduction in vibratory acceleration transmitted to the handle assembly 7 on the order of 25 percent or so, in relation to the vibration isolation unit featured, for example, in the generically related Frederickson et al U.S. Pat. No. 3,813,776.

As will be understood, the present invention may be practiced over a wide range of variations in material, arrangement, shape, size, location, numbers of elements, and mounting criteria.

Moreover, it is contemplated that the present invention may be practiced within the wide range of alternative concepts featured, for example, in the aforesaid et al U.S. Pat. No. 3,813,776, the disclosure of which has been heretofore herein incorporated by reference.

As will thus be recognized, those skilled in the chain saw vibrating isolating art, and familiar with the disclosure of this particular invention, may envision additions, deletions, substitutions or other modifications in relation to the preferred embodiment herein set forth, all of which would fall within the purview of the invention which is deemed to be set forth in the appended claims.

What is claimed is:
1. In a chain saw having
   a vibrating assembly including an engine having a crankshaft, and cutter chain means traversing a cutting path;
   support means including handle means; and
   a plurality of vibration isolation means interconnecting said vibrating assembly and said support means, with at least one of said vibration isolation means including
   resilient diaphragm means having an aperture, extending transversely of said cutting path, and extending generally parallel with the axis of rotation of said crankshaft;
   shaft means passing through said aperture of said diaphragm means, with said diaphragm means being journaled upon said shaft means;
   first, resilient, impedance means, mounted on said shaft means, and abuttingly and separably engaging one side of said diaphragm means;
   second, resilient, impedance means, mounted on said shaft means, and abuttingly and separably engaging an opposite side of said diaphragm means;
   first mounting means connecting said diaphragm means with one of said vibrating assembly and said support means; and
   second mounting means connecting said shaft means with the other of said vibrating assembly and said support means;
the improvement residing in said diaphragm means and comprising:
   a plurality of independently operable, resilient beam means spaced circumferentially about said shaft means,
      each of said resilient beam means being spaced circumferentially from others of said resilient beam means, and
      each of said resilient beam means being operable to flex longitudinally and transversely of said shaft means independently of others of said beam means;
   a plurality of independently operable, resilient compression pad means spaced circumferentially about said shaft means,
      each of said compression pad means being carried by a said beam means and spaced circumferentially from others of said compression pad means, and
      each of said compression pad means being operable to compressibly absorb energy in localized cooperation with said shaft means independent of others of said compression pad means; and
   a plurality of independently operable, energy dissipating and motion dampening means spaced circumferentially about said shaft means, with each of said energy dissipating means being disposed in energy dissipating, frictional cooperation with at least one of said impedance means,
      each of said energy dissipating and motion dampening means being carried by a said beam means and spaced circumferentially from others of said energy dissipating and motion dampening means, and
      each of said energy dissipating and motion dampening means being operable to effect energy dissipating and motion dampening, frictional cooperation with a said impedance means and said shaft means in response to movement of said energy dissipating means relative to said impedance means and said shaft means;
   generally annular resilient rim means encircling and supporting said spaced resilient beam means, with said resilient beam means depending inwardly thereof;
   each said compression pad means comprising a convex extremity of a said resilient beam means, disposed in relatively moveable, frictionally interacting engagement with said shaft means; and
   each said resilient beam means extending generally radially of said shaft means, with said plurality of generally radially extending resilient beam means providing a plurality of circumferentially spaced, radially extending, flexing means extending generally radially between said first and second impedance means and said generally annular, resilient rim means.

2. A chain saw as described in claim 1 wherein:
said resilient rim means includes lateral sides coverging toward said shaft means;
each said convex extremity of a said resilient beam means is disposed in substantially linear, localized engagement with said shaft means; and said diaphragm means includes a plurality of recess means alternating circumferentially with said resilient beam means.

3. In a chain saw having
a vibrating assembly including an engine having a crankshaft, and cutter chain means traversing a cutting path;
support means including handle means; and
a plurality of vibration isolation means interconnecting said vibrating assembly and said support means with at least one of said vibration isolation means including
resilient diaphragm means having an aperture and extending transversely of said cutting path;
shaft means passing through said aperture of said diaphragm means, with said diaphragm means being journaled upon said shaft means;
first, impedance means, mounted on said shaft means, and abuttingly and separably engaging one side of said diaphragm means;
second, impedance means, mounted on said shaft means, and abuttingly and separably engaging an opposite side of said diaphragm means;
first mounting means connecting said diaphragm means with one of said vibrating assembly and said support means; and
second mounting means connecting said shaft means with the other of said vibrating assembly and said support means;
the improvement residing in said diaphragm means and comprising:
a plurality of independently operable, resilient beam means spaced circumferentially about said shaft means,
each of said resilient beam means being spaced circumferentially from others of said resilient beam means, and
each of said resilient beam means being operable to flex longitudinally and transversely of said shaft means independently of others of said beam means;
a plurality of independently operable resilient compression pad means spaced circumferentially about said shaft means,
each of said compression pad means being carried by a said beam means and spaced circumferentially from others of said compression pad means, and
each of said compression pad means being operable to compressibly absorb energy in localized cooperation with said shaft means independent of others of said compression pad means; and
a plurality of independently operable, energy dissipating and motion dampening means spaced circumferentially about said shaft means, with each of said energy dissipating means being disposed in energy dissipating, frictional cooperation with at least one of said impedance means,
each of said energy dissipating and motion dampening means being carried by a said beam means and spaced circumferentially from others of said energy dissipating and motion dampening means, and
each of said energy dissipating and motion dampening means being operable to effect energy dissipating and motion dampening, frictional cooperation with a said impedance means and said shaft means in response to movement of said energy dissipating means relative to said impedance means and said shaft means;
generally annular resilient rim means encircling and supporting said spaced resilient beam means, with said resilient beam means depending inwardly thereof;
each said compression pad means comprising a convex extremity of a said resilient beam means, disposed in relatively moveable, frictionally interacting engagement with said shaft means; and
each said resilient beam means extending generally radially of said shaft means, with said plurality of generally radially extending resilient beam means providing a plurality of circumferentially spaced, radially extending, flexing means extending generally radially between said first and second impedance means and said generally annular, resilient rim means.

4. A chain saw as described in claim 3 wherein:
said resilient rim means includes lateral sides converging toward said shaft means;
each said convex extremity of a said resilient beam means is disposed in substantially linear, localized engagement with said shaft means; and
said diaphragm means includes a plurality of recess means alternating circumferentially with said resilient beam means.

5. In a vibration isolating unit comprising:
resilient diaphragm means having an aperture;
shaft means passing through said aperture of said diaphragm means, with said diaphragm means being journaled upon said shaft means;
first, impedance means, mounted on said shaft means, and abuttingly and separably engaging one side of said diaphragm means; and
second, impedance means, mounted on said shaft means, and abuttingly and separably engaging an opposite side of said diaphragm means;
the improvement residing in said diaphragm means and comprising:
a plurality of independently operable, resilient beam means spaced circumferentially about said shaft means,
each of said resilient beam means being spaced circumferentially from others of said resilient beam means, and
each of said resilient beam means being operable to flex longitudinally and transversely of said shaft means independently of others of said beam means; and
a plurality of independently operable, resilient compression pad means spaced circumferentially about said shaft means, each of said compression pad means being carried by a said beam means and spaced circumferentially from others of said compression pad means, and each of said compression pad means being operable to compressibly absorb energy in localized cooperation with said shaft means independent of others of said compression pad means;

generally annular resilient rim means encircling and supporting said spaced resilient beam means, with said resilient beam means depending inwardly thereof;

each said compression pad means comprising a convex extremity of a said resilient beam means, disposed in relatively moveable, frictionally interacting engagement with said shaft means; and each said resilient beam means extending generally radially of said shaft means, with said plurality of generally radially extending resilient beam means providing a plurality of circumferentially spaced, radially extending, flexing means extending generally radially between said first and second impedance means and said generally annular, resilient rim means.

6. A vibration isolating unit as described in claim 5 wherein:

said resilient rim means includes lateral sides converging toward said shaft means;

each said convex extremity of a said resilient beam means is disposed in substantially linear, localized engagement with said shaft means; and said diaphragm means includes a plurality of recess means alternating circumferentially with said resilient beam means.

* * * * *